(12) United States Patent
Tsunokawa

(10) Patent No.: US 10,380,125 B2
(45) Date of Patent: Aug. 13, 2019

(54) INFORMATION PROCESSING APPARATUS AND INFORMATION PROCESSING METHOD

(71) Applicant: SONY CORPORATION, Tokyo (JP)

(72) Inventor: Motoki Tsunokawa, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/306,180

(22) PCT Filed: Mar. 14, 2016

(86) PCT No.: PCT/JP2016/057916
§ 371 (c)(1),
(2) Date: Oct. 24, 2016

(87) PCT Pub. No.: WO2016/178337
PCT Pub. Date: Nov. 10, 2016

(65) Prior Publication Data
US 2018/0039632 A1    Feb. 8, 2018

(30) Foreign Application Priority Data
May 1, 2015    (JP) .................................. 2015-093967

(51) Int. Cl.
*G06F 17/30*    (2006.01)
*G06F 16/2457*    (2019.01)
(Continued)

(52) U.S. Cl.
CPC ...... *G06F 16/24578* (2019.01); *G06F 16/248* (2019.01); *G06F 16/3329* (2019.01); *G06F 17/2775* (2013.01); *G06F 17/2785* (2013.01)

(58) Field of Classification Search
CPC ............. G06F 17/3053; G06F 17/2775; G06F 17/2785
See application file for complete search history.

(56) References Cited

U.S. PATENT DOCUMENTS

2005/0154716 A1    7/2005   Watson et al.
2006/0235689 A1*  10/2006   Sugihara ............. G06F 17/2785
                                                    704/257
(Continued)

FOREIGN PATENT DOCUMENTS

BR         501151 A    11/2005
CA        2501668 A1    9/2005
(Continued)

OTHER PUBLICATIONS

International Search Report and Written Opinion of PCT Application No. PCT/JP2016/057916, dated Jun. 14, 2016, 2 pages of English Translation and 7 pages of ISRWO.

*Primary Examiner* — Loc Tran
(74) *Attorney, Agent, or Firm* — Chip Law Group

(57) ABSTRACT

An information processing apparatus including: an acquisition unit configured to acquire a structure of a query sentence obtained by analyzing the input query sentence and a structure of a target document obtained by analyzing the target document obtained by search that uses a search word generated by using the query sentence; and a control unit configured to determine an answer candidate by comparing the structure of the query sentence and the structure of the target document which are acquired by the acquisition unit, and generate information for presenting a result of the determination in contrast to the query sentence.

13 Claims, 12 Drawing Sheets

(51) Int. Cl.
    *G06F 16/248*     (2019.01)
    *G06F 17/27*     (2006.01)
    *G06F 16/332*     (2019.01)

(56)     References Cited

U.S. PATENT DOCUMENTS

2008/0183745 A1*   7/2008   Cancel .................. G06Q 30/02
2011/0320874 A1   12/2011   Shimada et al.
2012/0284283 A1   11/2012   Matsushita et al.

FOREIGN PATENT DOCUMENTS

| | | |
|---|---|---|
| CN | 1677403 A | 10/2005 |
| EP | 1580670 A1 | 9/2005 |
| JP | 2005-276213 A | 10/2005 |
| JP | 2010-262638 A | 11/2010 |
| JP | 2011-134094 A | 7/2011 |
| JP | 2011-150611 A | 8/2011 |
| JP | 2012-234430 A | 11/2012 |
| JP | 2013-206130 A | 10/2013 |
| KR | 10-2006-0044525 A | 5/2006 |
| KR | 10-2010-0119157 A | 11/2010 |
| MX | PA05003141 A | 10/2005 |

\* cited by examiner

FIG.6

| TYPE | CASE TYPE | EXPRESSION | MODALITY | QUERY TARGET |
|---|---|---|---|---|
| CASE | NOMINATIVE CASE | DAREGA | | INTERROGATIVE: PERSON |
| | LOCATIVE CASE | NIHONDE | | |
| | TIME CASE | SAISYONI | | |
| | OBJECT CASE | RAMENWO | | |
| PREDICATE | | TABETANODESUKA | QUESTION | |

FIG.7

| TYPE | CASE TYPE | | EXPRESSION | MODALITY | QUERY TARGET |
|---|---|---|---|---|---|
| CASE | LOCATIVE CASE | | JYAPANDEHA | | |
| | TIME CASE | | ITIBANSAISYONI | | |
| | NOMINATIVE CASE | | TOKUGAWAMITSUKUNIGA | | |
| | OBJECT CASE | | SYOUYURAMENWO | | |
| PREDICATE | | | TABETA | AFFIRMATIVE | |

FIG.8

| TYPE | CASE TYPE | EXPRESSION | MODALITY | QUERY TARGET |
|---|---|---|---|---|
| | NOMINATIVE CASE | DAREGA | | INTERROGATIVE: PERSON |
| CASE | LOCATIVE CASE | NIHONDE | | |
| | TIME CASE | SAISYONI | | |
| | OBJECT CASE | RAMENWO | | |
| PREDICATE | | TABETANODESUKA | QUESTION | |

| TYPE | CASE TYPE | EXPRESSION | MODALITY | QUERY TARGET |
|---|---|---|---|---|
| | LOCATIVE CASE | JYAPANDEHA | | |
| CASE | TIME CASE | ITIBANSAISYONI | | |
| | NOMINATIVE CASE | TOKUGAWAMITSUKUNIGA | | |
| | OBJECT CASE | SYOUYURAMENWO | | |
| PREDICATE | | TABETA | AFFIRMATIVE | |

FIG.9

| TYPE | CASE TYPE | EXPRESSION | MODALITY | QUERY TARGET |
|---|---|---|---|---|
| CASE | NOMINATIVE CASE | DAREGA | | INTERROGATIVE: PERSON |
| | LOCATIVE CASE | NIHONDE | | |
| | TIME CASE | SAISYONI | | |
| | OBJECT CASE | RAMENWO | | |
| PREDICATE | | TABETANODESUKA | QUESTION | |

| TYPE | CASE TYPE | EXPRESSION | MODALITY | QUERY TARGET |
|---|---|---|---|---|
| CASE | TIME CASE | JIBANSAISYONI | | |
| | NOMINATIVE CASE | TOKUGAWAMITSUKUNIGA | | |
| | OBJECT CASE | SYOUYURAMENWO | | |
| PREDICATE | | TABETA | AFFIRMATIVE | |

FIG. 10

| TYPE | CASE TYPE | EXPRESSION | MODALITY | QUERY TARGET |
|---|---|---|---|---|
| CASE | NOMINATIVE CASE | DAREGA | | INTERROGATIVE: PERSON |
| | LOCATIVE CASE | NIHONDE | | |
| | TIME CASE | SAISYONI | | |
| | OBJECT CASE | RAMENWO | | |
| PREDICATE | | TABETANODESUKA | QUESTION | |

| TYPE | CASE TYPE | EXPRESSION | MODALITY | QUERY TARGET |
|---|---|---|---|---|
| CASE | LOCATIVE CASE | AMERIKADEHA | | |
| | TIME CASE | ITIBANSAISYONI | | |
| | NOMINATIVE CASE | RINKANGA | | |
| | OBJECT CASE | SYOUYURAMENWO | | |
| PREDICATE | | TABETA | AFFIRMATIVE | |

FIG.11

| ANSWER CANDIDATE | NUMBER OF CANDIDATE CASES | SATISFACTION DEGREE | RELIABILITY DEGREE | SCORE |
|---|---|---|---|---|
| TOKUGAWA-MITSUKUNI | 35 CASES | 86% | 77% | 99.57 |
| ODANOBUNAGA | 7 CASES | 11% | 12% | 0.40 |
| TOYOTOMI-HIDEYOSHI | 2 CASES | 5% | 7% | 0.03 |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/057916 filed on Mar. 14, 2016, which claims priority benefit of Japanese Patent Application No. JP 2015-093967 filed in the Japan Patent Office on May 1, 2015. Each of the above-referenced applications is hereby incorporated herein by reference in its entirety.

TECHNICAL FIELD

The present disclosure relates to an information processing apparatus, an information processing method, and a computer program.

BACKGROUND ART

There are search sites equipped with search engines on the Internet. When there is information that a user wants to know, the user inputs a keyword into a search site and checks whether or not there is an answer requested by himself or herself in the information displayed by the search site. There is Patent Literature 1 and the like for example, as a technology relevant to information search that uses a search site.

CITATION LIST

Patent Literature

Patent Literature 1: JP 2011-118770A

SUMMARY OF INVENTION

Technical Problem

However, an existing search site displays sites that are hit on the keyword as a list, or only displays a part of the content of the site. Thus, it is unable to know whether or not the information that the user wants to know truly exists in the site that is hit in the search site, unless the user actually visits the site. Hence, there is a need for a scheme for obtaining the information that the user wants to know more efficiently.

Thus, the present disclosure proposes a new and improved information processing apparatus, an information processing method, and a computer program which reduce labor of the user and allow the user to obtain the information efficiently when obtaining the information that the user wants to know.

Solution to Problem

According to the present disclosure, there is provided an information processing apparatus including: an acquisition unit configured to acquire a structure of a query sentence obtained by analyzing the input query sentence and a structure of a target document obtained by analyzing the target document obtained by search that uses a search word generated by using the query sentence; and a control unit configured to determine an answer candidate by comparing the structure of the query sentence and the structure of the target document which are acquired by the acquisition unit, and generate information for presenting a result of the determination in contrast to the query sentence.

According to the present disclosure, there is provided an information processing method including: acquiring a structure of a query sentence obtained by analyzing the input query sentence and a structure of a target document obtained by analyzing the target document obtained by search that uses a search word generated by using the query sentence; and determining an answer candidate by comparing the structure of the query sentence and the structure of the target document which are acquired, and generating information for presenting a result of the determination in contrast to the query sentence.

According to the present disclosure, there is provided a computer program for causing a computer to execute: acquiring a structure of a query sentence obtained by analyzing the input query sentence and a structure of a target document obtained by analyzing the target document obtained by search that uses a search word generated by using the query sentence; and determining an answer candidate by comparing the structure of the query sentence and the structure of the target document which are acquired, and generating information for presenting a result of the determination in contrast to the query sentence.

Advantageous Effects of Invention

As described above, the present disclosure can provide a new and improved information processing apparatus, an information processing method, and a computer program which reduce labor of the user and allow the user to obtain the information efficiently when obtaining the information that the user wants to know.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is an explanatory diagram illustrating an example of a query intention structure.

FIG. 7 is an explanatory diagram illustrating an example of a target document structure.

FIG. 8 is an explanatory diagram illustrating an example of an answer candidate determination process.

FIG. 9 is an explanatory diagram illustrating another example of an answer candidate determination process.

FIG. 10 is an explanatory diagram illustrating another example of an answer candidate determination process.

FIG. 11 is an explanatory diagram illustrating an example of a result of an answer determination process.

DESCRIPTION OF EMBODIMENT(S)

Figure 1:
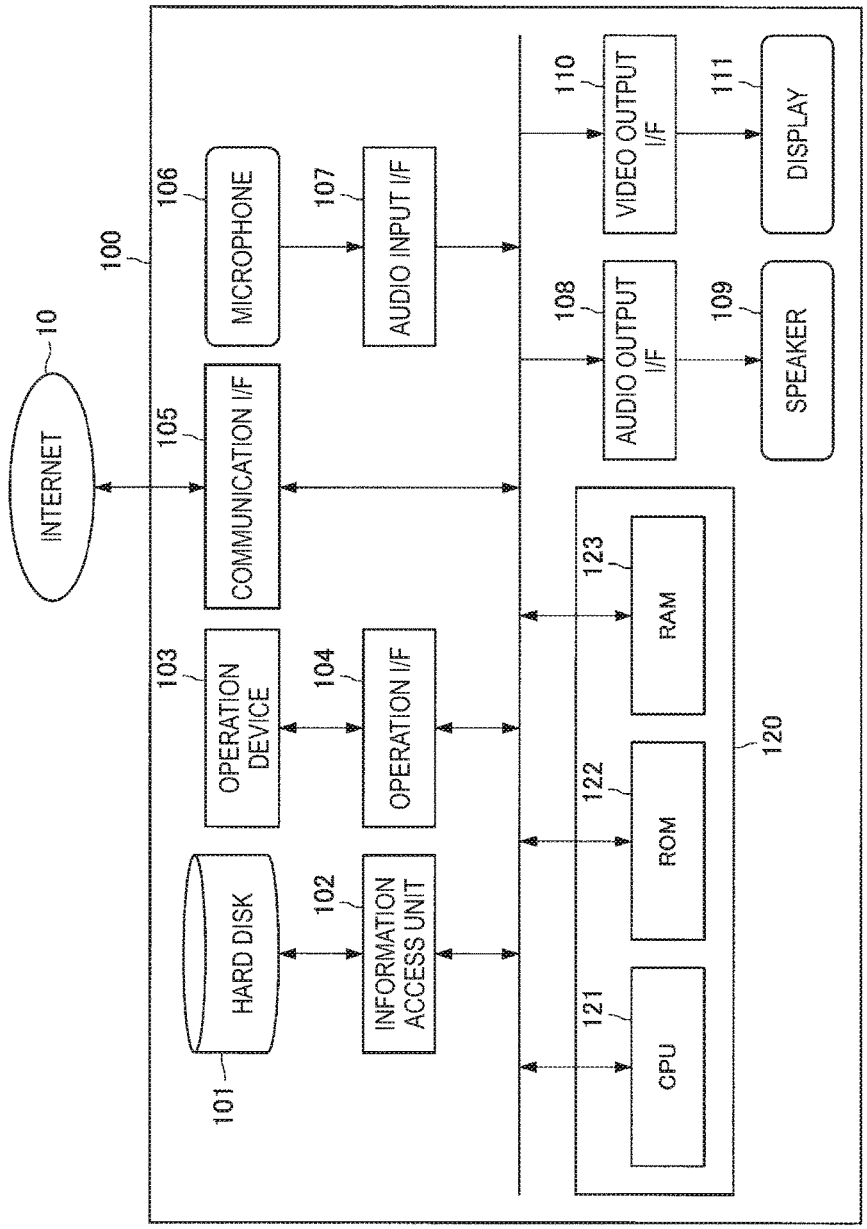
FIG. 1 is an explanatory diagram illustrating an exemplary hardware configuration of an information processing apparatus 100 according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, description will be made in the following order.
1. Embodiment of Present Disclosure
1.1. Background
1.2. Overview
1.3. Exemplary Hardware Configuration
1.4. Exemplary Function and Configuration
1.5. Exemplary Operation
1.6. Use Case Example
2. Conclusion

1. EMBODIMENT OF PRESENT DISCLOSURE

1.1. Background

First, a background of an embodiment of the present disclosure will be described, before describing the embodiment of the present disclosure in detail.

As described above, there are search sites equipped with search engines on the Internet. When there is information that the user wants to know, the user inputs a keyword into a search site, and checks whether or not an answer requested by himself or herself, in the information that the search site displays on the basis of the keyword.

However, the existing search site displays the sites that are hit on the keyword in a list, and only displays a part of the content of the sites, and it is unable to know whether or not the information that the user wants to know truly exists in the site unless the user actually visits the site.

Also, the existing search site hits the keyword, but hits and displays a site that has no relationship with the information that the user wants to know, and the information that the user wants to know is displayed at the back of the order by the algorithm even though the information has a relationship, resulting in bad accuracy.

Thus, there is a need for a scheme that allows the user to obtain the information that the user wants to know more efficiently, when the user wants to know the information.

Thus, the present case discloser has intensely studied a technology that reduces the labor of the user and allows the user to obtain the information efficiently, when obtaining the information that the user wants to know. As a result, the present case discloser has led up to devising a technology that allows the user to obtain the information efficiently, by presenting an answer directly to a query of natural sentence of the user.

1.2. Overview

Next, an overview of an embodiment of the present disclosure will be described. The embodiment of the present disclosure includes the below technical feature.

First, in the present embodiment, a query from the user is accepted as a natural sentence of voice, text, and the like. With regard to the query that is accepted as the natural sentence from the user, a structure of intention of the query is determined first by a language analysis process. When accepted as voice, the language analysis process is performed after generating a text by a voice recognition process. The structure of the intention of the query is also referred to as "query intention structure" in the present embodiment.

In the present embodiment, search of the information based on the query intention structure is performed subsequently, when the query intention structure is determined. This search of information includes search to the Internet and search to possessed data. The search target may be text, and the search target may be natural sentences, and the search process may be normal keyword search.

In the present embodiment, when the search of the information based on the query intention structure is performed, language analysis to the target document hits by the search is performed subsequently, and a structure of the target document is generated. The structure of the target document that is hit by the search is also referred to as "target document structure", in the present embodiment.

In the present embodiment, the query intention structure and the target document structure are compared subsequently when the target document structure is generated, and candidates of the answer to the query of the user are identified. The candidates of the answer to the query of the user are also referred to as "answer candidates", in the present embodiment. These answer candidates are not records (sites and documents itself that are hit by search, for example) that include the answer, but are locations itself of the answer that the user seems to be seeking.

In the present embodiment, the identification of the answer candidates may be performed for a number of target documents that are hit by the search, and may be performed to a predetermined number of target documents at higher ranks among the target documents that are hit by the search.

Subsequently, in the present embodiment, the identified answer candidates are counted, and an answer that is presented to the user is calculated. This answer that is presented to the user may be calculated on the basis of a specialty degree of the user, for example. The user may inputs the specialty degree of the user in advance, and the user may inputs the specialty degree at the time of presentation of the answer. Also, the specialty degree of the user may be input in each field, for example.

Subsequently, in the present embodiment, the calculated answer is output by a speech of voice, a display of text, or the like. Not only the answer but also the identified answer candidates may be output together. Also, the user may input a satisfaction degree with regard to the output answer. Further, the reliability degree may be set in advance for each site that stores the target document that is hit by the search, and the reliability degree to the answer may be output along with the answer.

The present embodiment includes the above described technical feature, to directly return the answer location to the query, when the user inputs the voice and the text of what the user wants to know, with the natural sentence. Thus, the present embodiment significantly reduces the labor of the user who searches for the answer, by including the above described technical feature. Also, the present embodiment includes the above described technical feature, and thereby the system processes many answer candidates, and thus the present embodiment can present the answer of higher accuracy than a person views the hit information one by one.

The present embodiment includes the above described technical feature, and thereby does not output the answer that exceeds the knowledge level of the user in consideration of the specialty degree of the user, and calculates and outputs a score value in consideration of the reliability degree of the site that is searched for and the satisfaction degree of the user when the same query is performed in the past, in order to return the answer, and thus probably gives the user the sense of reassurance to the output answer.

In the above, the overview of the embodiment of the present disclosure has been described. Next, the embodiment of the present disclosure will be described in detail.

1.3. Exemplary Configuration

First, an exemplary hardware configuration of an information processing apparatus 100 according to an embodiment of the present disclosure will be described. FIG. 1 is an explanatory diagram illustrating an exemplary hardware configuration of the information processing apparatus 100 according to an embodiment of the present disclosure. In the following, the exemplary hardware configuration of the information processing apparatus 100 according to an embodiment of the present disclosure will be described by using FIG. 1.

The process described below can be executed by using the hardware configuration of the information processing apparatus 100 illustrated in FIG. 1, for example. That is, the process described below is achieved by controlling the hardware illustrated in FIG. 1 by using a computer program.

Note that the form of the hardware illustrated in this FIG. 1 is arbitrary, and includes a personal computer, a portable information terminal such as a mobile phone, a PHS, and a PDA, a game machine, a contact or non-contact IC chip, a contact or non-contact IC card, a speaker, a television, a monitor, a wearable device, or various information home electrical appliances, for example. Note that the above PHS is the abbreviation of personal handy-phone system. Also, the above PDA is the abbreviation of personal digital assistant.

The information processing apparatus 100 illustrated in FIG. 1 mainly includes a hard disk 101, an information access unit 102, an operation device 103, an operation interface (I/F) 104, a communication I/F 105, a microphone 106, an audio input I/F 107, an audio output I/F 108, a speaker 109, a video output I/F 110, a display 111, and a control unit 120.

The hard disk 101 is a device for storing various types of data. The hard disk 101 has been illustrated in FIG. 1, but in other cases a semiconductor storage device, a light storage device, or a magneto optical storage device, or a like may be used. In the hard disk 101, a computer program that operates the information processing apparatus 100 may be stored for example, and data for achieving the feature described above may be stored.

The information access unit 102 executes read and write of the data to the hard disk 101, on the basis of the control from the control unit 120.

The operation device 103 is a device that accepts input operation from the user to the information processing apparatus 100, and for example is configured with a keyboard, a mouse, a touch panel, a button, a switch, a lever, and the like. Also, a remote controller that can transmit a control signal by utilizing infrared light or other radio waves is used as the operation device 103, in some cases.

The operation I/F 104 is an interface for passing the detail that is input by the operation device 103 to the control unit 120.

The communication I/F 105 is a communication interface for connecting to a network such as the Internet 10, and is a wired or wireless LAN, Bluetooth (registered trademark), or WUSB communication card, an optical communication router, an ADSL router, or a contact or contactless communication device, or the like, for example. Also, the network that is connected to the communication I/F 105 is configured with a network that is connected with wired or without wire, and is a home LAN, an infrared communication, a visible light communication, a broadcast, a satellite communication, or the like, for example, in addition to the Internet 10. Note that the above LAN is the abbreviation of local area network. Also, the above WUSB is the abbreviation of wireless USB. Then, the above ADSL is the abbreviation of asymmetric digital subscriber line.

The microphone 106 collects the sound of speech by the user of the information processing apparatus 100. The audio input I/F 107 is an interface for passing the detail collected by the microphone 106 to the control unit 120.

The speaker 109 outputs voice. The audio output I/F 108 is an interface for causing the speaker 109 to output the voice on the basis of sound data that is sent from the control unit 120.

The display 111 is a display device such as an LCD, a PDP, or an ELD, for example. The video output I/F 110 is an interface for causing the display 111 to output the video on the basis of video data that is sent from the control unit 120.

The control unit 120 controls the operation of the information processing apparatus 100. As illustrated in FIG. 1, the control unit 120 includes a CPU 121, a ROM 122, and a RAM 123.

The CPU 121 functions as a computation processing device or a control device for example, and controls overall operation or its part of each component on the basis of various types of programs recorded in the hard disk 101, the ROM 122, the RAM 123, or the like. The ROM 122 stores the programs that are read into the CPU 121, the data that is used in the computation, or the like. The RAM 123 temporarily or persistently stores the programs that is read into the CPU 121, various types of parameters that changes as appropriate when executing the program, and the like, for example.

In the above, the exemplary hardware configuration of the information processing apparatus 100 according to an embodiment of the present disclosure has been described by using FIG. 1. Next, an exemplary function and configuration of the control unit 120 that is included in the information processing apparatus 100 according to an embodiment of the present disclosure will be described by using FIG. 1.

Figure 2:
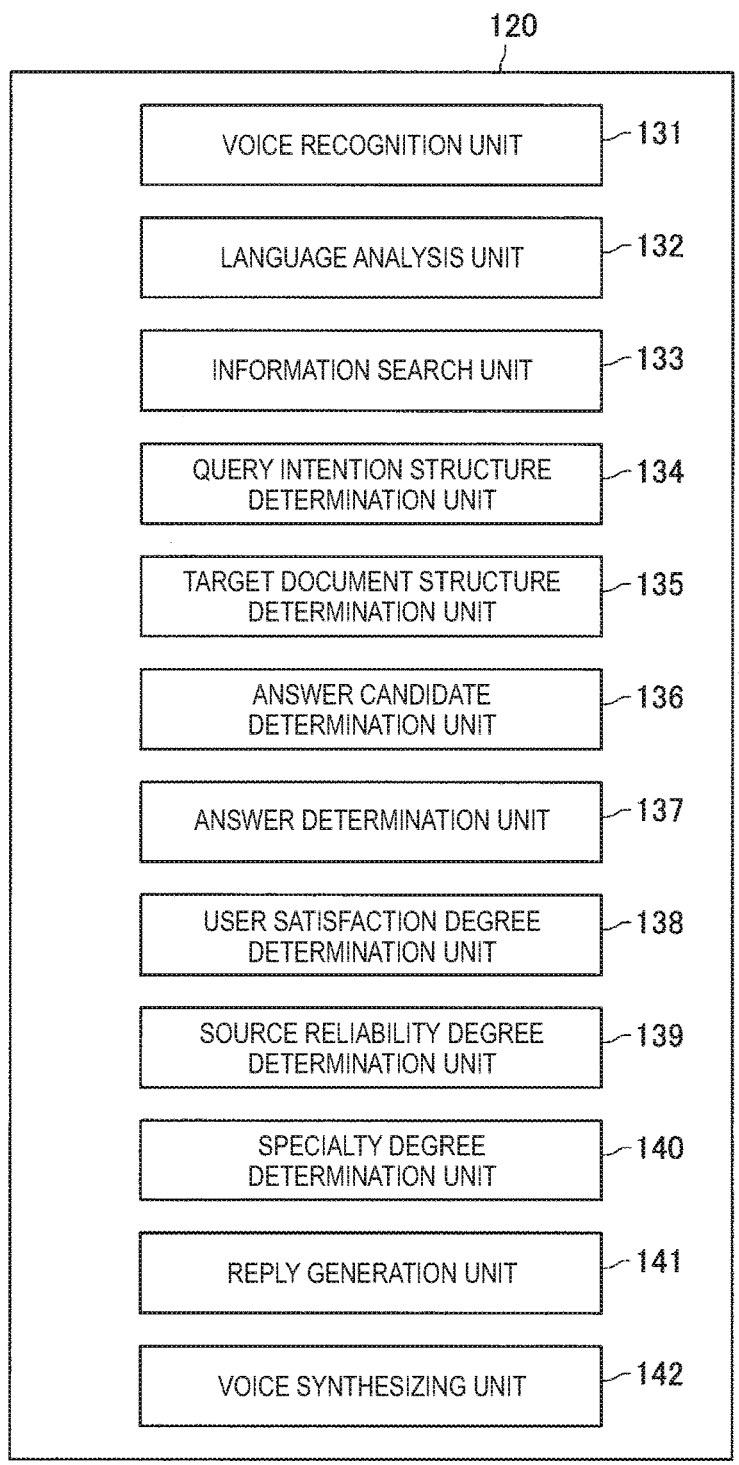
FIG. 2 is an explanatory diagram illustrating an exemplary function and configuration of a control unit 120.

FIG. 2 is an explanatory diagram illustrating the exemplary function and configuration of the control unit 120 that is included in the information processing apparatus 100 according to an embodiment of the present disclosure. In the following, the exemplary function and configuration of the control unit 120 will be described by using FIG. 2.

As illustrated in FIG. 2, the control unit 120 includes a voice recognition unit 131, a language analysis unit 132, an information search unit 133, a query intention structure determination unit 134, a target document structure determination unit 135, an answer candidate determination unit 136, an answer determination unit 137, a user satisfaction degree determination unit 138, a source reliability degree determination unit 139, a specialty degree determination unit 140, a reply generation unit 141, and a voice synthesizing unit 142.

The voice recognition unit 131 recognizes the detail that the user speaks to the microphone 106, and replaces the detail of the recognized speech with text. The process that replaces the detail that the user speaks with the text, by the voice recognition unit 131, is not limited to a specific process. The voice recognition unit 131 sends the detail of the speech of the user which has been replaced with the text to the language analysis unit 132.

The language analysis unit 132 executes an analysis process to the detail of the speech of the user that is replaced with the text, which is sent from the voice recognition unit, 131 and the text that the user inputs by using the operation device 103. The language analysis unit 132 performs morphological analysis, syntactic parsing, and the like, as the analysis process. Then, the language analysis unit 132 determines separation by spaces, case, modality, and the like, as a result of the analysis process. The language analysis unit 132 sends the result of the analysis process to the query intention structure determination unit 134.

When the user inputs "DAREGANIHONDESAISYONIRAMENWOTABETANODESUKA?" (which is a Japanese text that means "Who first ate ramen in Japan?"), the language analysis unit 132 separates the input by spaces as in "DAREGA NIHONDE SAISYONI RAMENWO TABETANODESUKA?" (which is a Japanese text that means "Who first ate ramen in Japan?"). Also, the language analysis unit 132 performs determination of case, modality, and the like to each clause. In the above example, "DAREGA NIHONDE SAISYONI RAMENWO" (which is a Japanese text that means "Who in Japan first ramen") is a case, and "TABETANODESUKA?" (which is a Japanese text that means "ate?") is a predicate. Also, "DAREGA" (which is a Japanese text that means "Who") is determined as a nominative case, and "NIHONDE" (which is a Japanese text that means "in Japan") is determined as a locative case, and "SAISYONI" (which is a Japanese text that means "first") is determined as a time case, and "RAMENWO" (which is a Japanese text that means "ramen") is determined as an object case, and "TABETANODESUKA?" (which is a Japanese text that means "ate?") is determined as modality of the question.

The information search unit 133 executes a search process on a search site of the Internet 10 and the data that is stored in the hard disk 101 and the like. The information search unit 133 uses the query intention structure generated by the query intention structure determination unit 134, when executing the search process. The information search unit 133 passes the hit target document to the target document structure determination unit 135, as a result of the search process.

The information search unit 133 extracts morphemes from the text input by the user, and picks up a feature keyword from among the extracted morphemes, and executes a search process on the search site on the Internet, the data carried by the information processing apparatus 100, and the like by using the keyword. The information search unit 133 may expand the picked keyword to synonymous words and the like by using a thesaurus dictionary as necessary.

For example, when the user inputs "DAREGANIHONDESAISYONIRAMENWOTABETANODESUKA?" (which is a Japanese text that means "Who first ate ramen in Japan?") as described above, the information search unit 133 picks up keywords such as "NIHON" (which is a Japanese text that means "Japan"), "JYAPAN (synonymous word expansion of Japan)", "SAISYO" (which is a Japanese text that means "first"), "RAMEN" (which is a Japanese text that means "ramen"), and "TABERU" (which is a Japanese text that means "eat"), and executes the search process on the search site on the Internet, the data carried by the information processing apparatus 100, and the like by using the keywords.

The query intention structure determination unit 134 performs language analysis by using the result of the analysis process by the language analysis unit 132, and generates a query intention structure. The detail of the query intention structure will be described later. The query intention structure determination unit 134 passes the generated query intention structure to the information search unit 133 and the answer candidate determination unit 136.

The target document structure determination unit 135 performs language analysis to the target document that is hit by the search process of the information search unit 133, to determine a target document structure. Note that the language analysis unit 132 may execute the language analysis process to the target document. When the language analysis unit 132 executes the language analysis process to the target document, the target document structure determination unit 135 determines the target document structure by using the result of the language analysis process by the language analysis unit 132. Upon determining the target document structure by performing the language analysis to the target document, the target document structure determination unit 135 sends the determined target document structure to the answer candidate determination unit 136.

The answer candidate determination unit 136 compares the query intention structure that is passed from the query intention structure determination unit 134, and the target document structure that is passed from the target document structure determination unit 135, to identify answer candidates. Upon identifying the answer candidates, the answer candidate determination unit 136 sends the identified answer candidates to the answer determination unit 137. The answer candidate determination unit 136 may perform the identification of the answer candidates a number of times according to the target document that is hit by the search process of the information search unit 133, and may perform the identification of the answer candidates for a predetermined number of target documents at higher ranks among the target documents that are hit by the search process of the information search unit 133.

The answer determination unit 137 counts the answer candidates identified by the answer candidate determination unit 136, and calculates the answer. The answer determination unit 137 may use at least one of the determination result of the user's satisfaction degree by the user satisfaction degree determination unit 138, the determination result of the source reliability degree by the source reliability degree determination unit 139, the count result of the specialty degree by the specialty degree determination unit 140, when calculating the answer. Upon calculating the answer, the answer determination unit 137 passes the calculated answer to the reply generation unit 141. The answer determination unit 137 may calculate a score indicating a commensurate degree as the answer, in consideration of the user's satisfaction degree and the source reliability degree. In the present embodiment, the answer determination unit 137 calculates the score on the basis of a predetermined calculation criterion. An example of a calculation method of the score will be described in detail later.

The user satisfaction degree determination unit 138 manages the satisfaction degree of the user to the answer that is presented to the user, and supplies the satisfaction degree to the answer determination unit 137, when the same query is issued from the user. For example, when presenting a certain answer to the user, the information processing apparatus 100 additionally asks whether or not the user is satisfied with the answer. The user satisfaction degree determination unit 138 records the number of cases in which the user answers that the user is satisfied with the answer. Then, when the same query is issued from the user, the user satisfaction degree determination unit 138 supplies a rate of the number of cases in which the user answers that the user is satisfied, to the answer determination unit 137 as the user's satisfaction degree.

The source reliability degree determination unit 139 counts the source reliability degree of the site where the target document exists, when acquiring the target document through the search site of the Internet 10. The source reliability degree is an example of a reliability degree of the basis for the answer candidates in the present disclosure. The source reliability degree can be set for each site or for each type of the site in advance. For example, public sites and sites of newspaper publishing companies and television stations may be set to a high reliability degree, and blogs of individuals may be set to a low reliability degree.

The specialty degree determination unit 140 supplies the specialty degree to the answer to the answer determination unit 137. The answer determination unit 137 can narrow the answer to the answer that matches to the specialty degree of the user himself or herself, by acquiring the specialty degree to the answer from the specialty degree determination unit 140, to present the answer.

The reply generation unit 141 generates information of a basis of the reply that is presented to the user, on the basis of the answer calculated by the answer determination unit 137. The reply generation unit 141 generates a reply sentence including the answer for example, as the information of the basis of the reply that is presented to the user. The reply generation unit 141 may output the generated information of basis of the reply that is presented to the user, as it is, from the display 111, and may pass the generated information to the voice synthesizing unit 142 to output the generated information with voice.

For example, the reply generation unit 141 generates information for presenting a result of determining the answer candidates by comparing the structure of the query sentence input by the user and the structure of the target document that is acquired by the search, in contrast to the query sentence. As described above, the information processing apparatus 100 according to the present embodiment can present which part of the information that is presented as the answer is what the user wants, to the user in an easily understandable manner, by generating the information for presenting the result of determining the answer candidates by comparing the structure of the query sentence and the structure of the target document that is acquired by the search, in contrast to the query sentence.

The reply generation unit 141 may generate information for displaying the result of the language analysis process to the target document which is the basis of the answer candidates. Also, the reply generation unit 141 may generate information for displaying in association with the result of the language analysis process to the query, when generating the information for displaying the result of the language analysis process to the target document. For example, when the target document includes a text "JYAPANDEHAI-TIBANSAISYONITOKUGAWAMITSUKUNIGASY-OUYURAMENWOTAB ETA" (which is a Japanese text that means "Mitsukuni TOKUGAWA ate soy sauce ramen in Japan for the first time"), the reply generation unit 141 may generate information for highlighting, by surrounding the keywords such as "JYAPAN" (which is a Japanese text that means "Japan"), "SAISYO" (which is a Japanese text that means "first"), "SYOUYURAMEN" (which is a Japanese text that means "soy sauce ramen"), and "TABETA" (which is a Japanese text that means "ate") in frames, for example.

Further the reply generation unit 141 may generate information for displaying the detailed data to each answer candidate, for example information such as the user's satisfaction degree, the source data reliability degree, and the specialty degree. Further, when a plurality of answer candidates exist, the reply generation unit 141 may generate the information for presenting only the answer candidate of the highest score as the answer, and may generate the information for presenting a part of the answer candidates as the answer, and may generate the information for presenting all of the answer candidates as the answer. Further, when a plurality of answer candidates exist, the reply generation unit 141 may generate the information for displaying the GUI for allowing the user to select a sort order of the answer candidates. The sort order of the answer candidates is a score order, a source reliability degree order, a user satisfaction degree order, a specialty degree order, or the like, for example.

The voice synthesizing unit 142 converts the reply sentence generated by the reply generation unit 141 to sound data. The conversion process to the sound data by the voice synthesizing unit 142 is not limited to a specific process. The voice synthesizing unit 142 sends the generated sound data to the audio output I/F 108, and causes the speaker 109 to output as voice based on the sound data.

The control unit 120 has the configuration illustrated in FIG. 2, and thereby can directly return an answer location to the query when the user inputs a natural sentence of what the user wants to know with voice or text. Thus, the control unit 120 has the configuration illustrated in FIG. 2, and thereby can expect an effect that significantly reduces the labor of the user who searches for the answer. Also, the control unit 120 has the configuration illustrated in FIG. 2, and thereby processes many answer candidates by the control unit 120, and thus can present to the user an answer of higher accuracy than a person views the hit information one by one.

Note that, in the exemplary function and configuration of the control unit 120 illustrated in FIG. 2, the query intention structure determination unit 134 and the target document structure determination unit 135 can function as an example of an acquisition unit of the present disclosure. Also, in the exemplary function and configuration of the control unit 120 illustrated in FIG. 2, the answer candidate determination unit 136, the answer determination unit 137, and the reply generation unit 141 can function as an example of a control unit of the present disclosure.

In the above, the exemplary function and configuration of the control unit 120 according to an embodiment of the present disclosure has been described by using FIG. 2. Next, the exemplary operation of the information processing apparatus 100 according to an embodiment of the present disclosure will be described.

1.4. Exemplary Operation

Figure 3:
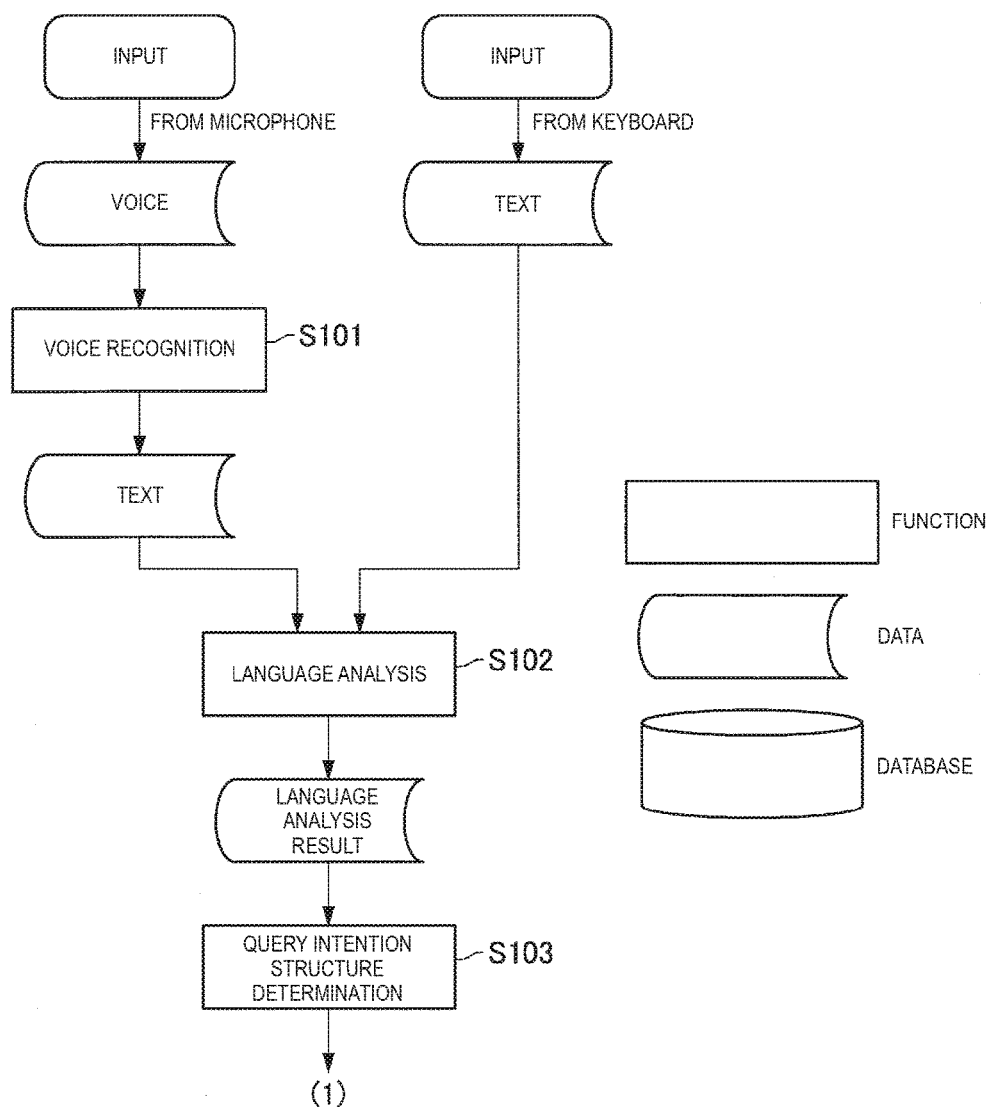
FIG. 3 is a flow diagram illustrating an exemplary operation of an information processing apparatus 100 according to an embodiment of the present disclosure.
Figure 4:
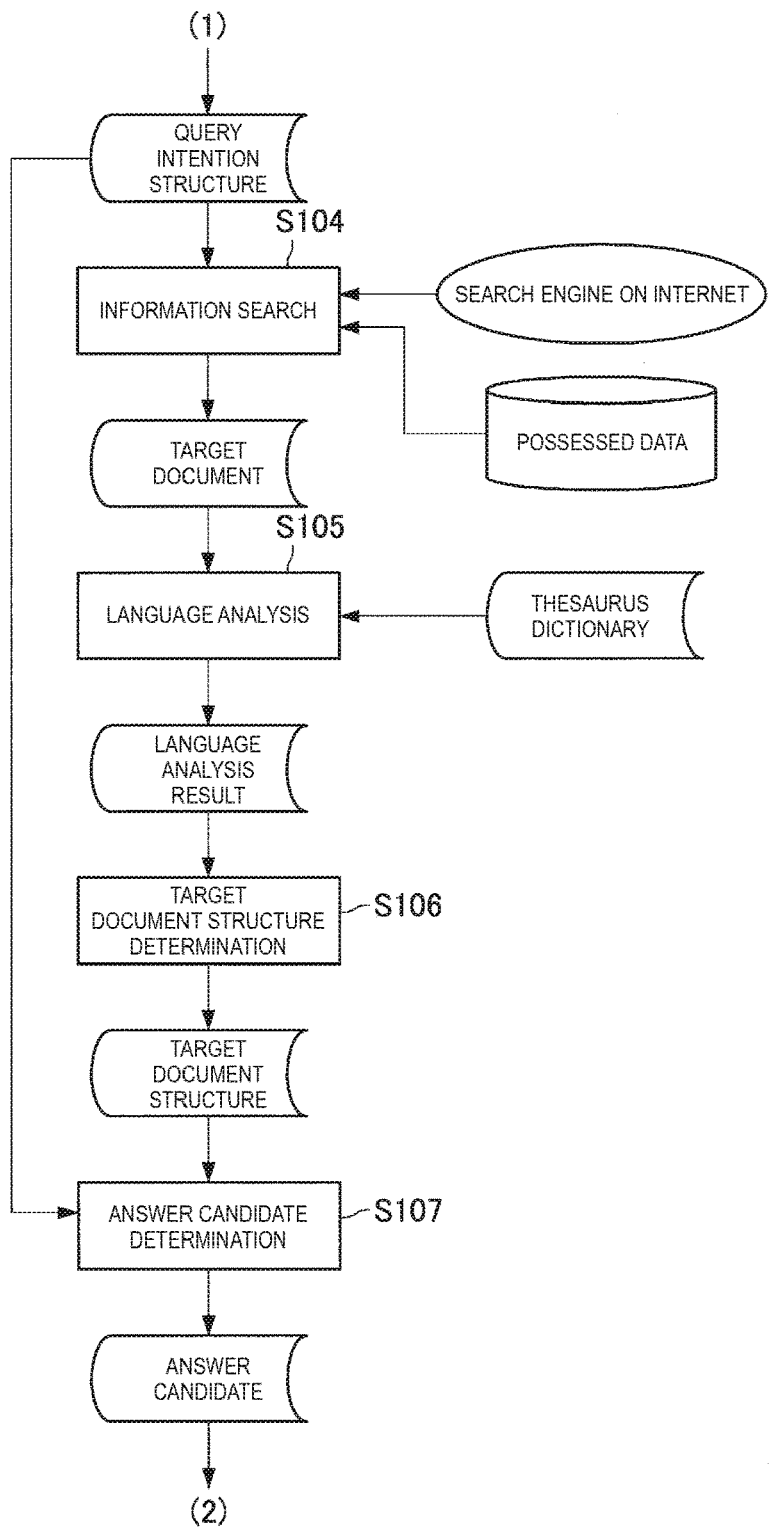
FIG. 4 is a flow diagram illustrating an exemplary operation of an information processing apparatus 100 according to an embodiment of the present disclosure.
Figure 5:
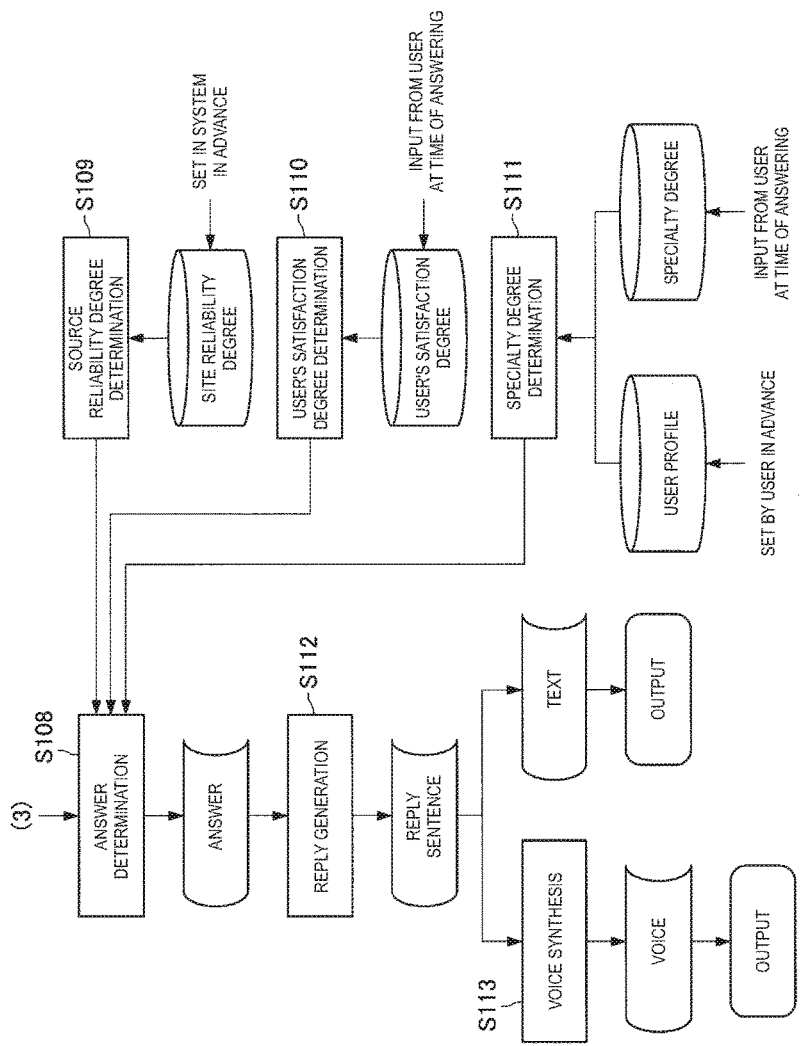
FIG. 5 is a flow diagram illustrating an exemplary operation of an information processing apparatus 100 according to an embodiment of the present disclosure.

FIGS. 3 to 5 are flow diagrams illustrating an exemplary operation of the information processing apparatus 100 according to an embodiment of the present disclosure. FIGS. 3 to 5 illustrate exemplary operation of the information processing apparatus 100, when calculating the answer to the query that is input by the user with the natural sentence and presenting the reply sentence based on the answer to the user. In the following, the exemplary operation of the information processing apparatus 100 according to an embodiment of the present disclosure will be described by using FIGS. 3 to 5.

When the user speaks the query to the microphone 106, the information processing apparatus 100 recognizes the detail that the user speaks, and replaces the detail of the recognized speech with a text (step S101). The voice recognition unit 131 executes the voice recognition of step S101, for example. The voice recognition process by the voice recognition unit 131 is not limited to a specific process.

Subsequently, the information processing apparatus 100 performs the language analysis process to the detail of the speech of the user which is replaced with the text in the above step S101, or the text that is input by the user by using the operation device 103 (step S102). The language analysis unit 132 executes the language analysis process of step S102, for example.

In the language analysis process of step S102, the morphological analysis, the syntactic parsing, and the like are performed to the detail of the speech of the user that is replaced with the text in the above step S101, or the text that is input by the user by using the operation device 103. Then, the morphological analysis, the syntactic parsing, and the like are performed to the text, and as a result the determination of the separation by spaces, the case, the modality, and the like to the text is performed.

For example, when the user inputs "DAREGANI-HONDESAISYONIRAMENWOTABETANODESUKA?" (which is a Japanese text that means "Who first ate ramen in Japan?"), the language analysis process of step S102 separates the input by spaces as in "DAREGA NIHONDE SAISYONI RAMENWO TABETANODESUKA?" (which is a Japanese text that means "Who first ate ramen in Japan?"). Also, the determination of the case, the modality, and the like is performed to each clause. In the above example, "DAREGA NIHONDE SAISYONI RAMENWO" (which is a Japanese text that means "Who in Japan first ramen") is a case, and "TABETANODESUKA?" (which is a Japanese text that means "ate?") is a predicate. Also, "DAREGA" (which is a Japanese text that means "Who") is determined as a nominative case, and "NIHONDE" (which is a Japanese text that means "in Japan") is determined as a locative case, and "SAISYONI" (which is a Japanese text that means "first") is determined as a time case, and "RAMENWO" (which is a Japanese text that means "ramen") is determined as an object case, and "TABETAN-ODESUKA?" (which is a Japanese text that means "ate?") is determined as modality of the question.

Subsequently, the information processing apparatus 100 executes the query intention structure determination process, by using the result of the language analysis process in the above step S102 (step S103). For example, the query intention structure determination unit 134 executes the query intention structure determination process of step S103. The query intention structure is generated from the analysis result of the language analysis process, in the query intention structure determination process of step S103. Note that the query intention structure determination process of step S103 is performed, only to the text whose modality is question, as a result of the language analysis process in the above step S102.

FIG. 6 is an explanatory diagram illustrating an example of the query intention structure. As described above, when the user inputs "DAREGANIHONDESAISYONIRAMEN-WOTABETANODESUKA?" (which is a Japanese text that means "Who first ate ramen in Japan?"), "DAREGA" (which is a Japanese text that means "Who") is determined as a nominative case, and "NIHONDE" (which is a Japanese text that means "in Japan") is determined as a locative case, and "SAISYONI" (which is a Japanese text that means "first") is determined as a time case, and "RAMENWO" (which is a Japanese text that means "ramen") is determined as an object case, and "TABETANODESUKA?" (which is a Japanese text that means "ate?") is determined as modality of the question, in the language analysis process of step S102. Then, the information processing apparatus 100 determines the case structure (predicate+case), and generates the query intention structure illustrated in FIG. 6, by mapping the interrogative and the attribute of interrogative (query target of what is asked), which is defined in advance. In the example illustrated in FIG. 6, the query target is determined to be a person, as a result of generation of the query intention structure.

Note that, in the present embodiment, the analysis of the case structure and the modality is performed in the language analysis process in the above step S102, but the present disclosure is not limited to such an example, and the query intention structure may be generated by employing a table including interrogative and question expression in the morphological analysis to the text.

Subsequently, the information processing apparatus 100 uses the keywords of the query intention structure that is generated by the query intention structure determination process of step S103, to execute the search process to the search site on the Internet, the data carried by the information processing apparatus 100, and the like (step S104). The information search unit 133 executes the search process of step S104, for example. The information processing apparatus 100 acquires the target document as a result of the search process of step S104. The target document is not limited to one.

The information processing apparatus 100 extracts the morphemes from the text input by the user in the search process of step S104, and picks up the feature keyword from among the extracted morphemes, and executes the search process to the search site on the Internet, the data carried by the information processing apparatus 100, and the like by using the keyword. The information processing apparatus 100 may expand the picked keyword to the synonymous words and the like by using thesaurus dictionary as necessary.

For example, when the user inputs "DAREGANI-HONDESAISYONIRAMENWOTABETANODESUKA?" (which is a Japanese text that means "Who first ate ramen in Japan?") as described above, the information processing apparatus 100 picks up the keywords such as "NIHON" (which is a Japanese text that means "Japan"), "JYAPAN" (synonymous word expansion of Japan)", "SAISYO" (which is a Japanese text that means "first"), "RAMEN" (which is a Japanese text that means "ramen"), and "TAB-ERU" (which is a Japanese text that means "eat"), and executes the search process to the search site on the Internet, the data carried by the information processing apparatus 100, and the like by using the keywords.

The information processing apparatus 100 executes the search process in step S104, and upon acquiring the target document, subsequently executes the language analysis process to the acquired target document (step S105). The target document structure determination unit 135 or the language analysis unit 132 executes the language analysis process to the target document of step S105, for example. Morphological analysis, syntactic parsing, reference resolution, and the like are performed, in the language analysis process to the target document of step S105. Then, in the language analysis process to the target document of step S105, the morphological analysis, the syntactic parsing, the reference resolution, and the like are performed to the target document, and as a result the determination such as the separation by spaces, the case, the modality, to the text is performed.

The information processing apparatus 100 subsequently executes the target document structure determination process, by using the result of the language analysis process to the target document (step S106). The target document structure determination unit 135 executes the target document structure determination process of step S106, for example. In the target document structure determination process of step S106, the target document structure is generated from the analysis result of the language analysis process to the target document. Note that the target document structure determination process of step S106 is performed, only to the text whose modality is affirmative, as a result of the language analysis process to the target document in the above step S105.

FIG. 7 is an explanatory diagram illustrating an example of the target document structure. The information processing apparatus 100 acquires the target document including the text "JYAPANDEHAITIBANSAISYONITOKUGA-WAMITSUKUNIGASYOUYURAMENWOTABETA" (which is a Japanese text that means "Mitsukuni TOKUGAWA ate soy sauce ramen in Japan for the first time"), as a result of performing the search process by using the keywords such as "NIHON" (which is a Japanese text that means "Japan"), "JYAPAN" (which is a Japanese text that means "Japan"), "SAISYO" (which is a Japanese text that means "first"), "RAMEN" (which is a Japanese text that means "ramen"), and "TABERU" (which is a Japanese text that means "eat"). In this case, in the target document structure determination process of step S106, "JYAPANDEHA" (which is a Japanese text that means "in Japan") is determined as a locative case, and "ITIBANSAISYONI" (which is a Japanese text that means "for the first time") is determined as a time case, and "TOKUGAWAMITSUKUNIGA" (which is a Japanese text that means "Mitsukuni TOKUGAWA") is determined as a nominative case, and "SYOUYURAMENWO" (which is a Japanese text that means "soy sauce ramen") is determined as an object case, and "TABETA" (which is a Japanese text that means "ate") is determined as a modality of affirmative.

The information processing apparatus 100 subsequently executes the answer candidate determination process, by comparing, the query intention structure generated by the process of the above step S103 and the target document structure that is generated by the process of step S106 (step S107). The answer candidate determination unit 136 performs the answer candidate determination process of step S107, for example.

The information processing apparatus 100 compares the query intention structure and the target document structure in the answer candidate determination process, to determine, although the predicate is identical semantically, whether the cases and the semantic expressions are identical at a predetermined rate or more. When determining whether the cases and the semantic expressions are identical at a predetermined rate or more, the information processing apparatus 100 is conditional on the one that is completely identical when the contrasted cases exist, and the one that is identical at a predetermined rate or more when the contrasted cases do not exist.

Then, the information processing apparatus 100 sets the case of the query target of the query intention structure that satisfies the above condition as the answer candidate. The information processing apparatus 100 may perform the answer candidate determination process a number of times according to the target documents that are hit in the search process, and may perform the answer candidate determination process to a predetermined number of target documents of higher ranks among the target documents that are hit in the search process.

FIG. 8 is an explanatory diagram illustrating an example of the answer candidate determination process of step S107. FIG. 8 illustrates an example that compares the query intention structure illustrated in FIG. 6 and the target document structure illustrated in FIG. 7. When comparing these two, the case identicalness rate is 4/4=100%, and the semantic expressions are identical in the four contrasted cases. Thus, when the query intention structure illustrated in FIG. 6 and the target document structure illustrated in FIG. 7 are compared, "TOKUGAWAMITSUKUNI" (which is a Japanese text that means "Mitsukuni TOKUGAWA") is determined as the answer candidate.

FIG. 9 is an explanatory diagram illustrating another example of the answer candidate determination process of step S107. FIG. 9 illustrates an example that compares the query intention structure illustrated in FIG. 6 and the target document structure in which "JYAPANDEHA" (which is a Japanese text that means "in Japan") is deleted from the target document structure illustrated in FIG. 7. When comparing these two, the case identicalness rate is 3/4=100%, and the semantic expressions are identical in three contrasted cases. Thus, if the one of the case identicalness rate equal to or more than 70% is decided as the answer candidates target when the query intention structure illustrated in FIG. 6 and the target document structure in which "JYAPANDEHA" (which is a Japanese text that means "in Japan") is deleted from the target document structure illustrated in FIG. 7 are compared, "TOKUGAWAMITSU-KUNI" (which is a Japanese text that means "Mitsukuni TOKUGAWA") is determined as the answer candidate.

FIG. 10 is an explanatory diagram illustrating a yet another example of the answer candidate determination process of step S107. FIG. 10 illustrates an example that compares the query intention structure illustrated in FIG. 6 and the target document structure that is generated from the target document that includes the acquired text "AMERIKADEHAITIBANSAISYONIRINKANGASYOUYURA-MENWOTABETA" (which is a Japanese text that means "In America, Lincoln ate soy sauce ramen for the first time"). When comparing these two, the expressions of the locative cases differ among the contrasted cases. Thus, the target document structure illustrated in FIG. 10 is not the target of extraction of the answer candidate.

The information processing apparatus 100 subsequently executes the answer determination process that calculates the answer that is presented to the user, from the answer candidates obtained in the answer candidate determination process of step S107 (step S108). The answer determination unit 137 executes the answer determination process of step S108, for example.

The information processing apparatus 100 counts the number of cases of the same contents, in the answer candidates, in the answer determination process of step S108. In the answer determination process of step S108, the results of the later described source reliability degree determination process (step S109), the user's satisfaction degree determination process (step S110), and the specialty degree determination process (step S111) may be used.

The source reliability degree determination process of step S109 is a process that counts the source reliability degree of the site in which the target document exist, when acquiring the target document through the search site of the Internet 10. The source reliability degree is an example of the basis for the answer candidates in the present disclosure. The source reliability degree determination unit 139 executes the source reliability degree determination process, for example. The source reliability degree can be set to each site, and each type of site, in advance. For example, public sites and sites of newspaper publishing companies and television stations may be set to a high reliability degree, and blogs of individuals may be set to a low reliability degree.

The user's satisfaction degree determination process of step S110 is a process that counts the user's satisfaction degree on the basis of the satisfaction degree of the user that is fed back for the presented answer and presents the user's satisfaction degree as necessary. The user satisfaction degree determination unit 138 executes the user's satisfaction degree determination process of step S110, for example.

For example, when the information processing apparatus 100 answers "TOKUGAWAMITSUKUNI" (which is a Japanese text that means "Mitsukuni TOKUGAWA") in response to the input of the query "NIHONDESAISYONI-RAMENWOTABETANOHADAREDESUKA?" (which is a Japanese text that means "Who first ate ramen in Japan?") from the user, the information processing apparatus 100 records in association with the number of cases in which the user feeds back his or her satisfaction to the answer to the information processing apparatus 100, each query intention structure, the target document structure, and the answer. Then, when the same query comes, the information processing apparatus 100 calculates the rate of the number of satisfactory cases as the user's satisfaction degree.

The same query is a query of this time in a case that the query intention structure of the query of this time and the query intention structure of the past query are identical completely, or in a case that the case identicalness rate between the query intention structure of the query of this time and the query intention structure of the past query is equal to or larger than a predetermined value, for example.

For example, when the query of this time is "NIHONDE-SAISYONIRAMENWOTABETANOHADARE-DESUKA?" (which is a Japanese text that means "Who first ate ramen in Japan?"), and the query "SAISYONINIHON-DERAMENWOTABETANOHADAREDESUKA?" (which is a Japanese text that means "Who first ate ramen in Japan?") is issued in the past, the query intention structure of the query of this time and the query intention structure of the past query are completely identical, and thus the query of this time is the same query as the past query. Also, when the query of this time is "SAISYONIRAMENWOTABET-ANOHADAREDESUKA?" (which is a Japanese text that means "Who first ate ramen in Japan?"), and the query "SAISYONINIHONDERAMENWOTABETANOHA-DAREDESUKA?" (which is a Japanese text that means "Who first ate ramen in Japan?") is issued in the past, the case identicalness rate between the query intention structure of the query of this time and the query intention structure of the past query is 3/4, and thus the query of this time is the same query as the past query, provided that the query is determined to be the same query if the case identicalness rate is equal to or larger than 70%, for example.

When the keyword in the user profile that is set to the information processing apparatus 100 in advance is included in the query sentence of this time from the user, the specialty degree determination process of step S111 is a process that acquires the specialty degree of the user in the user profile and the specialty degree to the answer. In the answer determination process of step S108, the specialty degree of the user in the user profile, and the specialty degree to the answer can be compared to extract only the answer that satisfies a predetermined condition. A predetermined condition may be the specialty degree of the user in the user profile which satisfies the specialty degree to the answer or more, for example. The information processing apparatus 100 extracts only the answer of the specialty degree of the user in the user profile which satisfies the specialty degree to the answer or more, and thereby set only the answer within the specialty degree of the user as the target to present.

The information processing apparatus 100 calculates a score indicating the commensurate degree as the answer, in consideration of the user's satisfaction degree and the source reliability degree, in the answer determination process of step S108. In the present embodiment, in the answer determination process of step S108, the information processing apparatus 100 calculates the score in such a manner that case number rate×user's satisfaction degree×source data reliability degree of each answer candidate are normalized to set the summation at 100%. Then, the information processing apparatus 100 sets the calculated score values sorted in the descending order, as the answer, in the answer determination process of step S108. As a matter of course, the calculation method of score is not limited to such an example.

FIG. 11 is an explanatory diagram illustrating an example of the result of the answer determination process of step S108. For example, the search process is executed to a query "NIHONDESAISYONIRAMENWOTABETANOHA-DAREDESUKA?" (which is a Japanese text that means "Who first ate ramen in Japan?") from the user and as a result of counting the answer candidates, there are 35 cases for "TOKUGAWAMITSUKUNI" (which is a Japanese text that means "Mitsukuni TOKUGAWA"), and 7 cases for "ODANOBUNAGA" (which is a Japanese text that means "Nobunaga ODA"), and 2 cases for "TOYOTOMI-HIDEYOSHI" (which is a Japanese text that means "Hideyoshi TOYOTOMI"). Then, the user's satisfaction degree is 86% and the source reliability degree is 77% with regard to "TOKUGAWAMITSUKUNI" (which is a Japanese text that means "Mitsukuni TOKUGAWA"). In the same way, the user's satisfaction degree is 11% and the source reliability degree is 12% with regard to "ODANOBUNAGA" (which is a Japanese text that means "Nobunaga ODA"), and the user's satisfaction degree is 5% and the source reliability degree is 7% with regard to "TOYOTOMIHIDEYOSHI" (which is a Japanese text that means "Hideyoshi TOYOTOMI").

As a result, the score of "TOKUGAWAMITSUKUNI" (which is a Japanese text that means "Mitsukuni TOKUGAWA") can be calculated at 99.57, and the score of "ODANOBUNAGA" (which is a Japanese text that means "Nobunaga ODA") can be calculated at 0.40, and the score of "TOYOTOMIHIDEYOSHI" (which is a Japanese text that means "Hideyoshi TOYOTOMI") can be calculated at 0.03, by the information processing apparatus 100 in the answer determination process of step S108.

The information processing apparatus 100 may change the answer to be displayed, according to the user profile. For example, when the user who has registered that the user has knowledge in personal computer in the user profile inputs a query "PASOKONNOSOKUDOWOHAYAKUSU-RUNIHA?" (which is a Japanese text that means "How to speed up the speed of a personal computer?") into the information processing apparatus 100, the information processing apparatus 100 may set a weight that increase the score of a technical answer such as "CPUWOYORIKOU-SOKUNAMONONINOSEKAEMASYOU" (which is a Japanese text that means "Replace the CPU with one having higher speed"). On the other hand, when the user who has registered that the user does not have knowledge in personal computer in the user profile inputs a query "PASOKON-NOSOKUDOWOHAYAKUSURUNIHA?" (which is a Japanese text that means "How to speed up the speed of a personal computer?") into the information processing apparatus 100, the information processing apparatus 100 may set a weight that increase the score of an answer whose technical degree is not very high, such as "DOUJINIFUKUSU-UNOAPURIWOTATIAGENAIYOUNISIMASYOU" (which is a Japanese text that means "Do not start a plurality of applications at the same time").

Specifically, the user of the information processing apparatus 100 sets a keyword and a specialty degree as the user profile in advance. For example, the user sets the specialty degree within 0 to 1 for the keyword "personal computer". The information processing apparatus 100 compares the specialty degree A set to the user profile with the specialty degree B given to each answer, and extracts only the answer of A≥B for example to present the answer that matches the user's specialty degree to the user.

Upon executing the answer determination process in the above step S108, the information processing apparatus 100 subsequently executes a reply sentence generation process for generating a reply sentence to be presented to the user, on the basis of the answer obtained in the answer determination process (step S112). The reply generation unit 141 executes the reply sentence generation process of step S112, for example. Note that the information processing apparatus 100 may present only the answer that is simply obtained in the answer determination process to the user, instead of the text.

For example, when generating "TOKUGAWAMITSU-KUNI" (which is a Japanese text that means "Mitsukuni TOKUGAWA") as the answer to the query "NIHONDE-SAISYONIRAMENWOTABETANOHADARE-DESUKA?" (which is a Japanese text that means "Who first ate ramen in Japan?") from the user for example, the information "NIHONDESAISYONIRAMENWOTABET-ANOHATOKUGAWAMITSUKUNIDESU" (which is a Japanese text that means "Who first ate ramen in Japan is Mitsukuni TOKUGAWA") in the reply sentence generation process of step S112, and may generate information "TOKUGAWAMITSUKUNI" (which is a Japanese text that means "Mitsukuni TOKUGAWA") simply.

Upon executing the reply sentence generation process in the above step S112, the information processing apparatus 100 may subsequently output the generated reply sentence from the display 111, and may executes a voice synthesizing process for converting the generated reply sentence to voice and outputting the voice (step S113). The voice synthesizing unit 142 executes the voice synthesizing process of step S113, for example. The voice synthesizing process of step S113 is not limited to a specific process.

Here, an output example of the reply sentence by the information processing apparatus 100 will be described.
(1) When Outputting Voice For example, when the user inputs the query "NIHONDE-SAISYONIRAMENWOTABETANOHADARE-DESUKA?" (which is a Japanese text that means "Who first ate ramen in Japan?") into the information processing apparatus 100, the information processing apparatus 100 extracts 3 answer candidates of Mitsukuni TOKUGAWA, Nobunaga ODA, and Hideyoshi TOYOTOMI in the order from top score. When the top score of the answer candidates leads the second and followers by a large margin, the information processing apparatus 100 outputs the voice of "KOTAEHA, TOKUGAWAMITSUKUNIDESU" (which is a Japanese text that means "Answer is Mitsukuni TOKUGAWA") for example. On the other hand, when the score of the answer candidates balance, the information processing apparatus 100 outputs the voice of "TOKUGAWAMITSUKUNI, ODANOBUNAGA, TOYOTOMIHIDEYOSHIGAKAN-GAERAR EMASU" (which is a Japanese text that means "Maybe, Mitsukuni TOKUGAWA, Nobunaga ODA, or Hideyoshi TOYOTOMI") for example.
(2) When Outputting by Displaying on Display Conceivable outputting by displaying the reply sentence on the display is various. For example, when the user inputs the query "NIHONDESAISYONIRAMENWOTABETA-HITOHADAREDESUKA?" (which is a Japanese text that means "Who first ate ramen in Japan?") into the information processing apparatus 100, the information processing apparatus 100 extracts 3 answer candidates of Mitsukuni TOKUGAWA, Nobunaga ODA, and Hideyoshi TOYO-TOMI in the order from top score. When the top score of the answer candidates leads the second and followers by a large margin, the information processing apparatus 100 simply outputs only the text of "KOTAEHA,TOKUGAWAMITSU-KUNIDESU" (which is a Japanese text that means "Answer is Mitsukuni TOKUGAWA") on the display 111 for example.

Also, the information processing apparatus 100 may perform display that teaches the result of the language analysis process for the query sentence and the target document.

Figure 12:
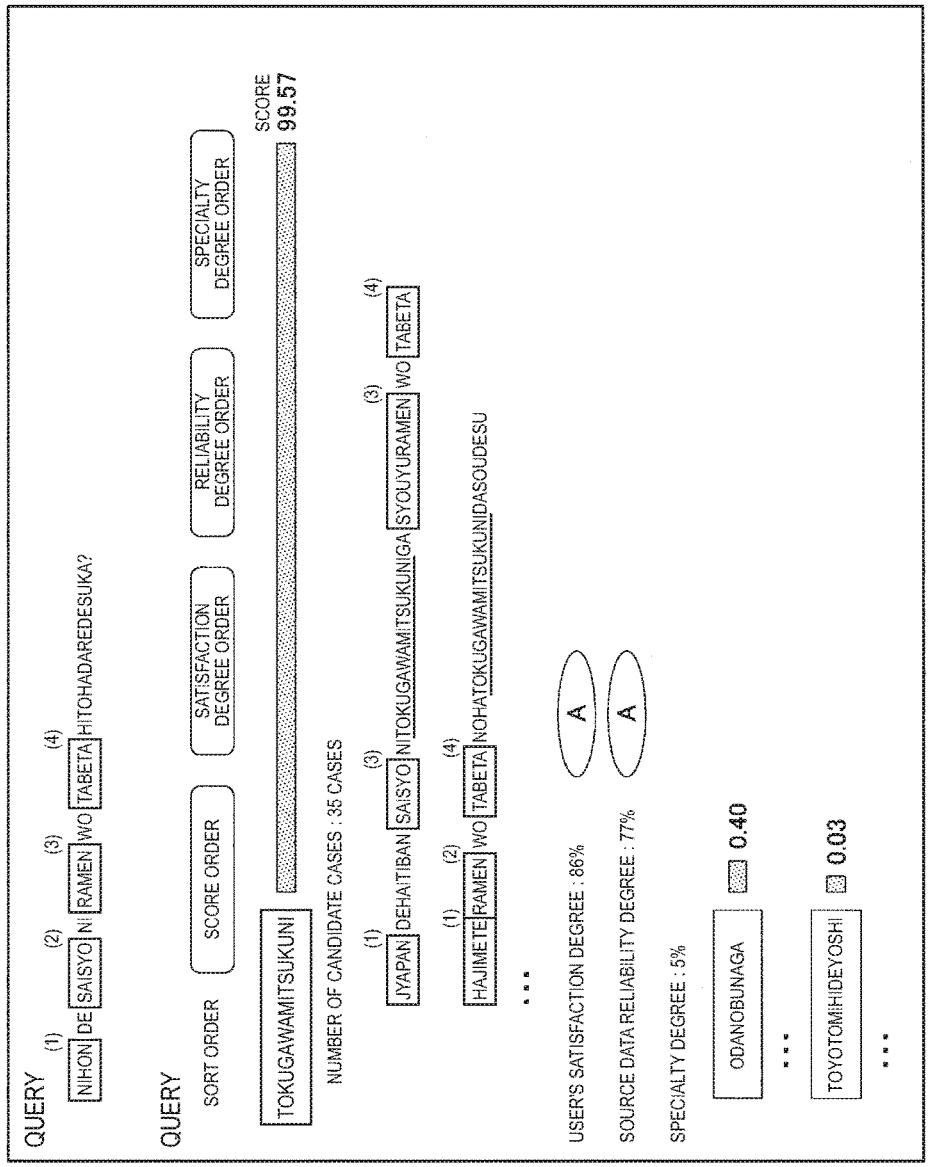
FIG. 12 is an explanatory diagram illustrating an output example of a reply sentence by an information processing apparatus 100.

FIG. 12 is an explanatory diagram illustrating an output example of the reply sentence to the display 111 by the information processing apparatus 100. When the user inputs the query "NIHONDESAISYONIRAMENWOTABETA-HITOHADAREDESUKA?" (which is a Japanese text that means "Who first ate ramen in Japan?") to the information processing apparatus 100, the information processing apparatus 100 extracts 3 answer candidates of Mitsukuni TOKUGAWA, Nobunaga ODA, and Hideyoshi TOYO-TOMI in the order from top score, and calculates the scores as in FIG. 11.

The information processing apparatus 100 may highlight the keywords such as "NIHON" (which is a Japanese text that means "Japan"), "SAISYO" (which is a Japanese text that means "first"), "RAMEN" (which is a Japanese text that means "ramen"), and "TABETA" (which is a Japanese text that means "ate") by surrounding the keywords with frames as in FIG. 12. Then, the information processing apparatus 100 displays the answers in the order of Mitsukuni TOKUGAWA, Nobunaga ODA, and Hideyoshi TOYO-TOMI, and may make the display larger as the score is larger. Also, bar graphs and scores may be displayed next to the answer candidates.

Also, the information processing apparatus 100 may highlight the answer location in the target document which is the basis of each answer candidate. For example, when the target document includes a text "JYAPANDEHAITIBAN-SAISYONITOKUGAWAMITSUKUNIGASYOUYURA-MENWOTAB ETA" (which is a Japanese text that means "Mitsukuni TOKUGAWA ate soy sauce ramen in Japan for the first time"), the information processing apparatus 100 may highlight a part of the answer by coloring the part of "TOKUGAWAMITSUKUNI" (which is a Japanese text that means "Mitsukuni TOKUGAWA"), by making the character thicker, by making the characters larger, by underlining, and the like. The example illustrated in FIG. 12 illustrates a situation in which the part of "TOKUGAWAMITSUKUNI" (which is a Japanese text that means "Mitsukuni TOKUGAWA") is underlined.

Further, the information processing apparatus 100 may display the result of the language analysis process to the target document which is the basis of each answer candidate. The information processing apparatus 100 may display the result of the language analysis process to the target document, in association with the result of the language analysis process to the query. For example, when the target document includes the text "JYAPANDEHAITIBANSAISYONI-TOKUGAWAMITSUKUNIGASYOUYURAMEN-WOTAB ETA" (which is a Japanese text that means "Mitsukuni TOKUGAWA ate soy sauce ramen in Japan for the first time"), the information processing apparatus 100 may highlight the keywords such as "JYAPAN" (which is a Japanese text that means "Japan"), "SAISYO" (which is a Japanese text that means "first"), "SYOUYURAMEN" (which is a Japanese text that means "soy sauce ramen"), and "TABETA" (which is a Japanese text that means "ate") by surrounding the keywords with frames.

Further, the information processing apparatus 100 may display the detailed data for each answer candidate, for example information such as the user's satisfaction degree, the source data reliability degree, and the specialty degree.

Further, when a plurality of answer candidates exist, the information processing apparatus 100 may display a GUI for causing the user to select the sort order of the answer candidates. FIG. 12 illustrates an example that displays a GUI for selecting the sort order of the answer candidates from among the score order, the user satisfaction degree order, the source reliability degree order, and the specialty degree order.

1.6. Use Case Example

Lastly, a use case example in which the information processing apparatus 100 according to the present embodiment is used will be described.

The information processing apparatus 100 according to the present embodiment is a device that performs search by using a natural sentence spoken by the user and a text input by the user and presents the answer to the user directly. Below usage of this information processing apparatus 100 is conceived.

For example, when the user views a television program and suddenly has a question about a cast member, a site, and the like, the user can check for the question simply by using the information processing apparatus 100 according to the present embodiment.

Also, for example, when the user listens to music and suddenly has a question about an artist and a song, the user can check for the question simply by using the information processing apparatus 100 according to the present embodiment.

Also, for example, when the user walks around a town and suddenly has a question, the user can check for the question simply by using the information processing apparatus 100 according to the present embodiment.

Also, for example, when the user prepares document while working and suddenly has a question, the user can check for the question simply by using the information processing apparatus 100 according to the present embodiment.

Also, for example, the user can check for the information that is saved in the information processing apparatus 100 simply by using the information processing apparatus 100 according to the present embodiment, by setting the schedule, the document, and the like of the user which is saved in the information processing apparatus 100 as the search target.

When the information of a plurality of users, for example the information of a family is saved in the information processing apparatus 100, if the user queries "OTOUSAN-NOKONDONONITIYOUBINOYOTEIHA?" (which is a Japanese text that means "What schedule does the father have on the next Sunday?"), the information processing apparatus 100 according to the present embodiment can directly output the schedule of the father such as "GORUFU" (which is a Japanese text that means "golf"). When the schedule or the like of the family is checked, mutual call names in the family, call names of frequently visited sites, and the like may be registered in the information processing apparatus 100 in advance. Even when those call names are included in the query sentence, the information processing apparatus 100 can interpret the call names and present the answer.

2. CONCLUSION

As described above, an embodiment of the present disclosure provides an information processing apparatus 100 that analyzes the language of the query in the natural sentence of the user, and generates the search word from the analysis result to search by using the search word, and analyzes the language with regard to the search result, and extracts and presents the answer to the query of the user.

The information processing apparatus 100 according to an embodiment of the present disclosure determines the query intention structure by analyzing the language the query, when the user speaks a query "NIHONDESAISYONIRA-MENWOTABETAHITOHADAREDESUKA?" (which is a Japanese text that means "Who first ate ramen in Japan?") or inputs the query by using the keyboard and the touch panel or the like, for example. Also, the information processing apparatus 100 according to an embodiment of the present disclosure generates the search word from the result of the language analysis, and searches the Internet 10 or the like by using the search word, and acquires the target document as the search result. Also, the information processing apparatus 100 according to an embodiment of the present disclosure analyzes the language of the target document to determine the target document structure, and extracts the answer candidates which are the candidates of the answer to the query, by comparing the query intention structure and the target intention structure. Then, the information processing apparatus 100 according to an embodiment of the present disclosure calculates the scores for the answer candidates, and outputs the answer on the basis of the scores.

The information processing apparatus 100 according to an embodiment of the present disclosure can enable the user to obtain the answer efficiently, by extracting and presenting the answer to the query of the user.

Steps in processes executed by devices in this specification are not necessarily executed chronologically in the order described in a sequence chart or a flow chart. For example, steps in processes executed by devices may be executed in a different order from the order described in a flow chart or may be executed in parallel.

Further, a computer program can be created which causes hardware such as a CPU, ROM, or RAM, incorporated in each of the devices, to function in a manner similar to that of structures in the above-described devices. Furthermore, it is possible to provide a recording medium having the computer program recorded thereon. Moreover, by configuring respective functional blocks shown in a functional block diagram as hardware, the hardware can achieve a series of processes.

Also, a part or all of the respective functional blocks illustrated in the functional block diagram used in the above description may be configured with a server device that is connected via the network such as the Internet, for example. Also, the component of each functional block illustrated in the functional block diagram used in the above description may be configured with a single device, and may be configured with a system in which a plurality of devices cooperate. For example, the system in which the plurality of devices cooperate can include a combination of a plurality of server devices, a combination of a server device and a terminal device, or the like.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)
An information processing apparatus including:
an acquisition unit configured to acquire a structure of a query sentence obtained by analyzing the input query sentence and a structure of a target document obtained by analyzing the target document obtained by search that uses a search word generated by using the query sentence; and
a control unit configured to determine an answer candidate by comparing the structure of the query sentence and the structure of the target document which are acquired by the acquisition unit, and generate information for presenting a result of the determination in contrast to the query sentence.

(2)
The information processing apparatus according to (1), wherein
the control unit generates information in consideration of a score indicating a commensurate degree as an answer, the score being calculated for the answer candidate.

(3)
The information processing apparatus according to (1) or (2), wherein
the control unit generates information in consideration of a reliability degree of a basis for the answer candidate.

(4)
The information processing apparatus according to any of (1) to (3), wherein when a plurality of answer candidates exist, the control unit generates information for presenting only an answer candidate of a highest possibility of being an answer.

(5)
The information processing apparatus according to any of (1) to (3), wherein
when a plurality of answer candidates exist, the control unit generates information for presenting a plurality of answer candidates of high possibilities of being an answer.

(6)
The information processing apparatus according to any of (1) to (5), wherein
the control unit generates information for sorting answer candidates in a predetermined condition.

(7)
The information processing apparatus according to any of (1) to (6), wherein
the acquisition unit acquires the structure of the query sentence by analyzing the query sentence and/or the structure of the target document by analyzing the target document.

(8)
The information processing apparatus according to any of (1) to (7), wherein
the control unit determines an answer of the query sentence from a determination result of the answer candidate.

(9)
The information processing apparatus according to (8), wherein
the control unit calculates a score indicating a commensurate degree as an answer for each answer candidate.

(10)
The information processing apparatus according to (9), wherein the control unit calculates the score by using a satisfaction degree that is fed back for an answer that is presented to the same query, with respect to each answer candidate.

(11)
The information processing apparatus according to (9), wherein
the control unit calculates the score by using a reliability degree that is set to a site where the target document exists, with respect to each answer candidate.

(12)
The information processing apparatus according to any of (8) to (11), wherein
the control unit determines the answer by using a specialty degree of a querying person and a specialty degree set to the target document, with respect to each answer candidate.

(13)
The information processing apparatus according to any of (1) to (12), wherein
the acquisition unit generates the search word by using the query sentence, and performs search using the search word to acquire the target document.

(14)
An information processing method including:
acquiring a structure of a query sentence obtained by analyzing the input query sentence and a structure of a target document obtained by analyzing the target document obtained by search that uses a search word generated by using the query sentence; and
determining an answer candidate by comparing the structure of the query sentence and the structure of the target document which are acquired, and generating information for presenting a result of the determination in contrast to the query sentence.

(15)

A computer program for causing a computer to execute:
acquiring a structure of a query sentence obtained by analyzing the input query sentence and a structure of a target document obtained by analyzing the target document obtained by search that uses a search word generated by using the query sentence; and determining an answer candidate by comparing the structure of the query sentence and the structure of the target document which are acquired, and generating information for presenting a result of the determination in contrast to the query sentence.

REFERENCE SIGNS LIST

100 information processing apparatus
120 control unit

The invention claimed is:

1. An information processing apparatus, comprising: a central processing unit (CPU) configured to: acquire a structure of a query sentence by analysis of the query sentence and a structure of a target document by analysis of the target document, wherein the target document is a result of a search based on at least one search word in the query sentence;
    determine an answer candidate based on: a comparison of the structure of the query sentence and the structure of the target document, and a determination that a plurality of grammatical cases of the structure of the query sentence is identical to a plurality of grammatical cases of the structure of the target document at a determined rate;
    generate information to present the determined answer candidate in association with the structure of the query sentence;
    calculate a score that indicates a commensurate degree as an answer for each determined answer candidate of a plurality of determined answer candidates, the score is further based on a satisfaction degree that is fed back for a previous answer that is presented to the same query sentence, with respect to each determined answer candidate of the plurality of determined answer candidates.

2. The information processing apparatus according to claim 1, wherein the CPU is configured to generate the information in consideration of a reliability degree of a basis for the answer candidate.

3. The information processing apparatus according to claim 1, wherein
    the CPU is configured to generate the information for presentation of the answer candidate from the plurality of determined answer candidates, and
    the answer candidate has highest possibility of being the answer among the plurality of determined answer candidates.

4. The information processing apparatus according to claim 1, wherein
    the CPU is configured to generate the information for presentation of the plurality of determined answer candidates.

5. The information processing apparatus according to claim 1, wherein the CPU is configured to generate the information for a sort operation on the plurality of determined sorting answer candidates based on a determined condition.

6. The information processing apparatus according to claim 1, wherein the CPU is further configured to determine an answer of the query sentence based on a determination result of the answer candidate.

7. The information processing apparatus according to claim 1, wherein the CPU is further configured to calculate the score based on a reliability degree that is set to a site where the target document exists, with respect to each answer candidate of the plurality of determined answer candidates.

8. The information processing apparatus according to claim 6, wherein the CPU is further configured to determine the answer based on a specialty degree of a querying person and a specialty degree set to the target document, with respect to each answer candidate of the plurality of determined answer candidates.

9. The information processing apparatus according to claim 1, wherein the CPU is configured to generate the at least one search word based on the query sentence and execute the search based on the at least one search word to acquire the target document.

10. The information processing apparatus according to claim 1, wherein the CPU is configured to generate the information for presentation of a determination result of the answer candidate together with the query sentence in association with the structure of the query sentence.

11. The information processing apparatus according to claim 1, wherein the CPU is configured to generate the information for presentation of the target document including the answer candidate in association with the structure of the query sentence.

12. An information processing method, comprising:
    in an formation processing apparatus:
        acquiring a structure of a query sentence by analysis of the query sentence and a structure of a target document by analysis of the target document, wherein the target document is a result of a search based on at least one search word in the query sentence;
        determining an answer candidate based on:
            a comparison of the structure of the query sentence and the structure of the target document,
            a determination that a plurality of grammatical cases of the structure of the query sentence is identical to a plurality of grammatical cases of the structure of the target document at a determined rate;
        generating information to present the determined answer candidate in association with the structure of the query sentence; and
        calculating a score that indicates a commensurate degree as an answer for each determined answer candidate of a plurality of determined answer candidates, the score is further based on a satisfaction degree that is fed back for a previous answer that is presented to the same query sentence, with respect to each determined answer candidate of the plurality of determined answer candidates.

13. A non-transitory computer-readable medium having stored thereon, computer-executable instructions, which when executed by a computer, cause the computer to execute operations, the operations comprising:
    acquiring a structure of a query sentence by analysis of the query sentence and a structure of a target document by analysis of the target document, wherein the target document is a result of a search based on at least one search word in the query sentence;

determining an answer candidate based on:
- a comparison of the structure of the query sentence and the structure of the target document which, and
- a determination that a plurality of grammatical cases of the structure of the query sentence is identical to a plurality of grammatical cases of the structure of the target document at a determined rate;

generating information to present the determined answer candidate in association with the structure of the query sentence; and calculating a score that indicates a commensurate degree as an answer for each determined answer candidate of a plurality of determined answer candidates, the score is further based on a satisfaction degree that is fed back for a previous answer that is presented to the same query sentence, with respect to each determined answer candidate of the plurality of determined answer candidates.

* * * * *